Aug 5, 1941.   H. W. ALDEN ET AL   2,251,258
AXLE-DRIVEN MECHANISM
Filed Sept. 20, 1939

INVENTOR
Herbert W. Alden
Lawrence R. Buckendale
BY Ralph L. Stevens ATTORNEY

Patented Aug. 5, 1941

2,251,258

UNITED STATES PATENT OFFICE 2,251,258

AXLE-DRIVEN MECHANISM

Herbert W. Alden and Lawrence R. Buckendale, Detroit, Mich., assignors to The Timken-Detroit Axle Company, Detroit, Mich., a corporation of Ohio Application September 20, 1939, Serial No. 295,842

6 Claims. (Cl. 105—132.1)

This invention relates to mechanism for driving electric generators from the rotating axles of moving vehicles. More particularly, the invention is concerned especially with the driving of generators on Pullman or other railway cars.

Apparatus of this type usually consists of a sleeve or quill non-rotatably secured to a railcar axle and surrounded by gearing and bearings that must withstand the shocks and stresses of modern high speed operation.

It is the primary object of the present invention to provide an improved and safe arrangement for transmitting the torque reactions of the driven unit to the car framework.

This and other objects of our invention will clearly appear from a study of the following detailed description when taken in conjunction with the accompanying drawing and the appended claims. In the drawing:

Figure 1:
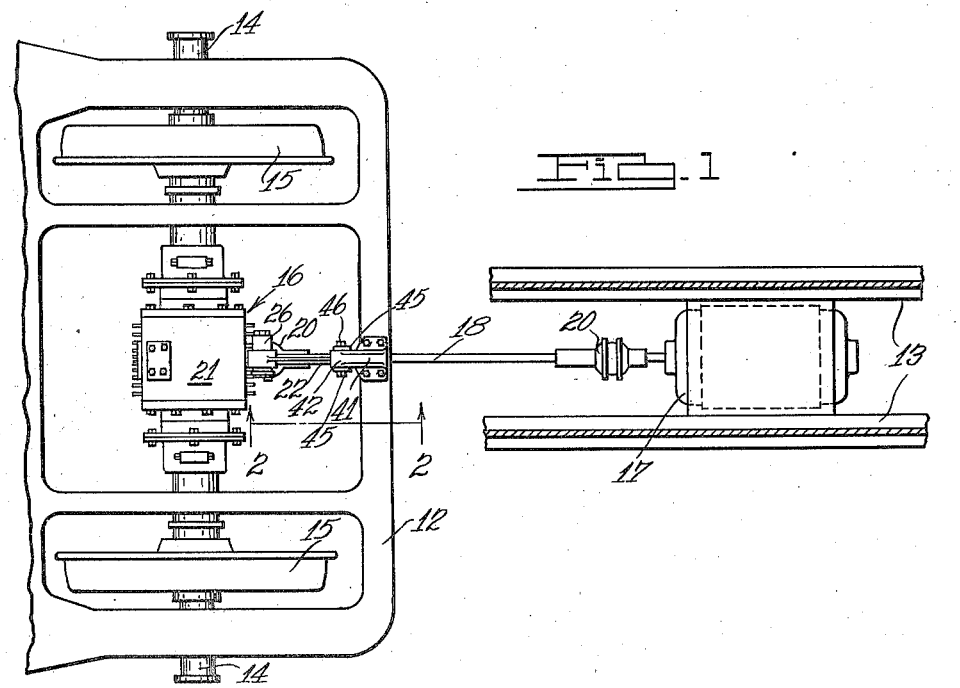
Fig. 1 is a plan view showing the complete generator and drive combination of the present invention in association with sufficient railcar structure to illustrate the mode of application.
Figure 2:
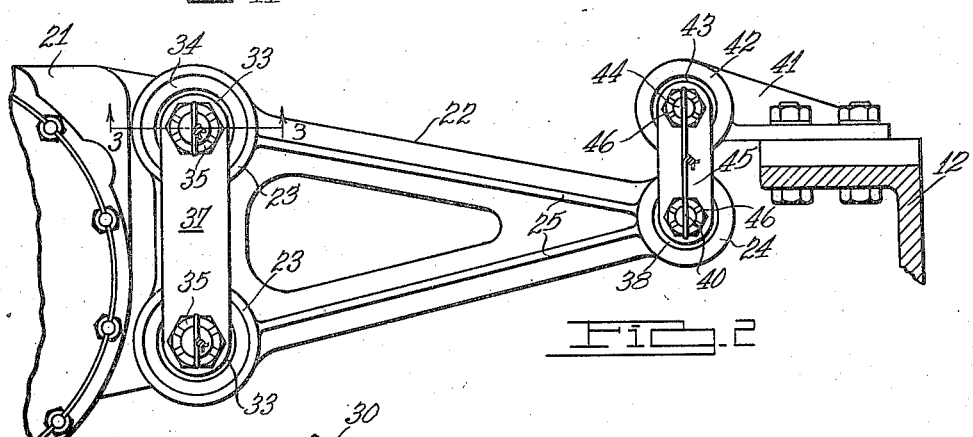
Fig. 2 is an enlarged fragmentary section taken substantially upon the plane of line 2—2 in Fig. 1 to illustrate the torque transmitting mechanism.
Figure 3:
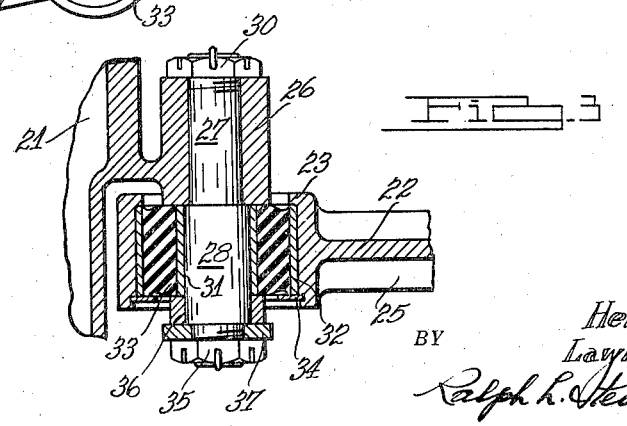
Fig. 3 is a sectional view taken substantially along the plane of line 3—3 in Fig. 2.

With continued reference to the drawing, wherein like characters are employed to designate like parts and with particular reference for the moment to Fig. 1, the numeral 12 represents a portion of a truck-frame of a railway car that also embodies the usual frame sills 13. A conventional axle 14 having wheels 15 is associated with the truck-frame and surrounded by a drive unit 16 for the purpose of driving an electric generator 17 that is rigidly supported by the sills 13. The unit 16 includes gearing (not shown) which rotates the generator by way of a shaft 18 and a pair of flexible joints or couplings 20.

The unit 16 includes a main housing section 21 that must be held against rotation in response to the torque reactions set up by the driven gearing and accordingly the following improved mechanism is connected between the housing and the frame 12 to prevent such rotation while permitting natural and substantially free flexibility of movement of the axle relative to the frame. This mechanism comprises a triangularly shaped rigid arm 22 having at its rear end a pair of vertically spaced cylindrical sockets 23 and at its forward end a single similar socket 24, all interconnected by integral strengthening ribs 25.

The housing section 21 has a pair of offset parallel sleeves 26, horizontally disposed and vertically spaced to bring them into alignment with the sockets 23, in which position they are held by the following means. Each sleeve 26 receives the small end 27 of a pin 28, and a nut 30 is utilized to clamp the pin securely to the sleeve. Each socket 23 is sufficiently large to receive a bushing assembly that snugly surrounds the pin 28 and that comprises a pair of concentric rings 31, 32 between which is disposed a rubber ring 33. The parts 31—33 are formed as a unit that may be inserted bodily into the socket 23 during assembly, a snap ring 34 being used to retain the unit within the socket. The rubber preferably is deformed when placed between the rings 31, 32 so that it is under tension in a direction axially of the bushing assembly, and it may be vulcanized to the rings if desired.

A nut 35 is utilized to press a metal collar 36 against the ring 31 and thus clamp the latter against the sleeve 26; and a safety bar 37, common to both pins has its ends apertured to surround the pin ends between the collars 36 and the nuts 35. In the event of deterioration of the rubber after a long period of use to the point where, in the absence of retaining means, it would permit one or both of the sockets 23 to move laterally past their retaining nuts 35 and drop downwardly, the bar 37 serves as a stop to keep the sockets in surrounding relationship to the pins and thus prevents the rear end of the torque arm from falling off. The metal between the housing section 21 and the sockets 23 prevents the arm from dropping off in the other direction.

In similar manner the socket 24 at the forward end of the torque arm is equipped with a rubber bushing assembly 38 that surrounds a pin 40, and adjacent this socket the truck frame 12 rigidly carries a bracket 41 having an identical socket 42 equipped with a bushing assembly 43 and a pin 44. The ends of the pins 40 extend axially beyond the sockets in both directions, each pair of extending ends projecting through a metal strap 45 to receive a pair of nuts 46. The two straps 45 are forced towards each other into clamping engagement with the inner parts of the bushing assemblies 38, 43 by the nuts 46, and hence these straps serve as safety bars (like bar 37) as well as links for shackling the torque arm to the frame. The bushing assemblies include collars (not shown) identical with collar 36 except for size, in order to space the straps 45 from the ends of the sockets 24, 42.

The rubber rings of the several bushings serve to cushion shocks and to yieldingly resist any twisting and rotational tendencies of the housing section 21; and those of the bushings 38 and 43 operate to prevent free pivotal action about the axes of the pins 40 and 44 respectively. All of this contributes to shock-proof and noiseless operation while imparting just sufficient flexibility to the entire assembly.

What is claimed is:

1. In combination with a vehicle framework and an axle-carried gear housing in which torque reactions are set up as the axle is rotated, mechanism for transmitting the torque reactions from the housing to the frame and comprising: a generally triangular member disposed in a substantially vertical plane and having two of its corners attached to the housing by a pair of horizontal pins surrounded by deformable bushings and having its third corner disposed in proximity to said framework, and means flexibly connecting said third corner to said framework.

2. In the combination defined in claim 1, said connecting means comprising a substantially vertical link having horizontal pivotal connections with said third corner and said framework, said connections embodying rubber units that resist oscillation in the pivots.

3. In combination with a vehicle framework and an axle-carried gear housing in which torque reactions are set up as the axle is rotated, mechanism for transmitting the torque reactions from the housing to the framework and comprising: a rigid arm of generally triangular form extending between the housing and the framework, a pair of horizontal pins carried by said housing and designed for connection to two of the corners of the arm, rubber bushings surrounding said pins, said arm having horizontal open-ended boxes receiving said bushings, strap means connected between said pins and overlapping said boxes to positively prevent the latter from becoming accidentally detached from the pins, and means flexibly connecting the third corner of said arm to the framework.

4. In combination with a vehicle framework and an axle-carried gear housing, torque-transfer mechanism comprising a rigid arm united at one end to said housing and extending away therefrom longitudinally of the vehicle to a point adjacent a portion of said framework, that end of the arm adjacent the framework having an integral transverse sleeve concentric with a pin surrounded by a resilient deformable bushing, a similar sleeve mounted transversely on the framework and provided with a similar pin and a similar bushing, a rigid link substantially normal to said arm and connected non-rotatably at its ends to said pins, said bushings being assembled under deformation so that they yieldingly resist oscillation of the pins relative to the sleeves while permitting a limited movement of said housing transversely of the framework.

5. In the combination defined in claim 4, there being two of said links, one outside each end of the pair of bushings, and means securing the links to the pins so that the arm cannot be detached accidentally from the framework.

6. In combination with a vehicle framework and an axle-carried gear housing, torque-transfer mechanism comprising a substantially triangular arm arranged horizontally and longitudinally of the vehicle, each corner of the arm having a transverse sleeve and said housing having a pair of sleeves aligned with two of the arm sleeves, the third sleeve of the arm being disposed adjacent a portion of the framework, pins extending through the aligned sleeves, each pin having a soft rubber bushing fitted into one of its surrounding sleeves, means secured to said pins to prevent accidental separation of the aligned sleeves, said third sleeve of the arm carrying a pin surrounded by a rubber bushing, and a pair of vertical links pivotally interconnecting the ends of the last mentioned pin with the framework, said links being disposed at opposite ends of the last mentioned rubber bushing.

HERBERT W. ALDEN.
LAWRENCE R. BUCKENDALE.